United States Patent [19]

McGee

[11] Patent Number: 5,071,250
[45] Date of Patent: Dec. 10, 1991

[54] SPECTROPHOTOMETER WITH FAN SPEED CONTROL FOR TEMPERATURE REGULATION

[75] Inventor: Philip A. McGee, Beltsville, Md.

[73] Assignee: NIRSystems Incorporated, Silver Spring, Md.

[21] Appl. No.: 460,520

[22] Filed: Jan. 3, 1990

[51] Int. Cl.[5] .............................. G01J 3/28; G01J 3/18
[52] U.S. Cl. .................................. 356/328; 250/352; 356/334; 356/319
[58] Field of Search .................. 356/51, 316, 319, 320, 356/323, 324, 325; 250/352

[56] References Cited

U.S. PATENT DOCUMENTS

| | | | |
|---|---|---|---|
| 2,562,525 | 7/1951 | Cary | 250/43 |
| 4,097,152 | 6/1978 | Kisher | 356/328 |
| 4,150,786 | 4/1979 | Sable | 236/91 A |
| 4,469,441 | 9/1984 | Bernier et al. | 356/316 |
| 4,726,657 | 2/1988 | Perkins et al. | 356/244 |
| 4,807,247 | 2/1989 | Robbins | 356/51 |

FOREIGN PATENT DOCUMENTS 56-166449 12/1981 Japan .
0257045 11/1987 Japan .................................. 356/326

OTHER PUBLICATIONS

Model 6250 System Near Infrared Spectrophotometer, Pacific Scientific Instrument Division, 1984.

*Primary Examiner*—F. L. Evans
*Assistant Examiner*—K. P. Hantis
*Attorney, Agent, or Firm*—Lane, Aitken & McCann

[57] ABSTRACT

In a spectrophotometer having an oscillating grating, an entrance slit and an exit slit and a light source to irradiate said grating through said entrance slit, the grating and the light source are mounted on a heat sink plate and a fan is provided to blow air over both sides of said heat sink plate. A temperature sensing transducer is mounted in the heat sink plate to sense the temperature of the heat sink plate and the output of the temperature sensor is amplified by an amplifier to energize the electric motor of the fan to control the speed of the fan in accordance with the temperature sensed by the temperature sensor to thereby maintain the temperature of the heat sink plate at a constant value upon the system reaching equilibrium. In this manner, the wavelength drift of the system is reduced to a very low value.

7 Claims, 2 Drawing Sheets

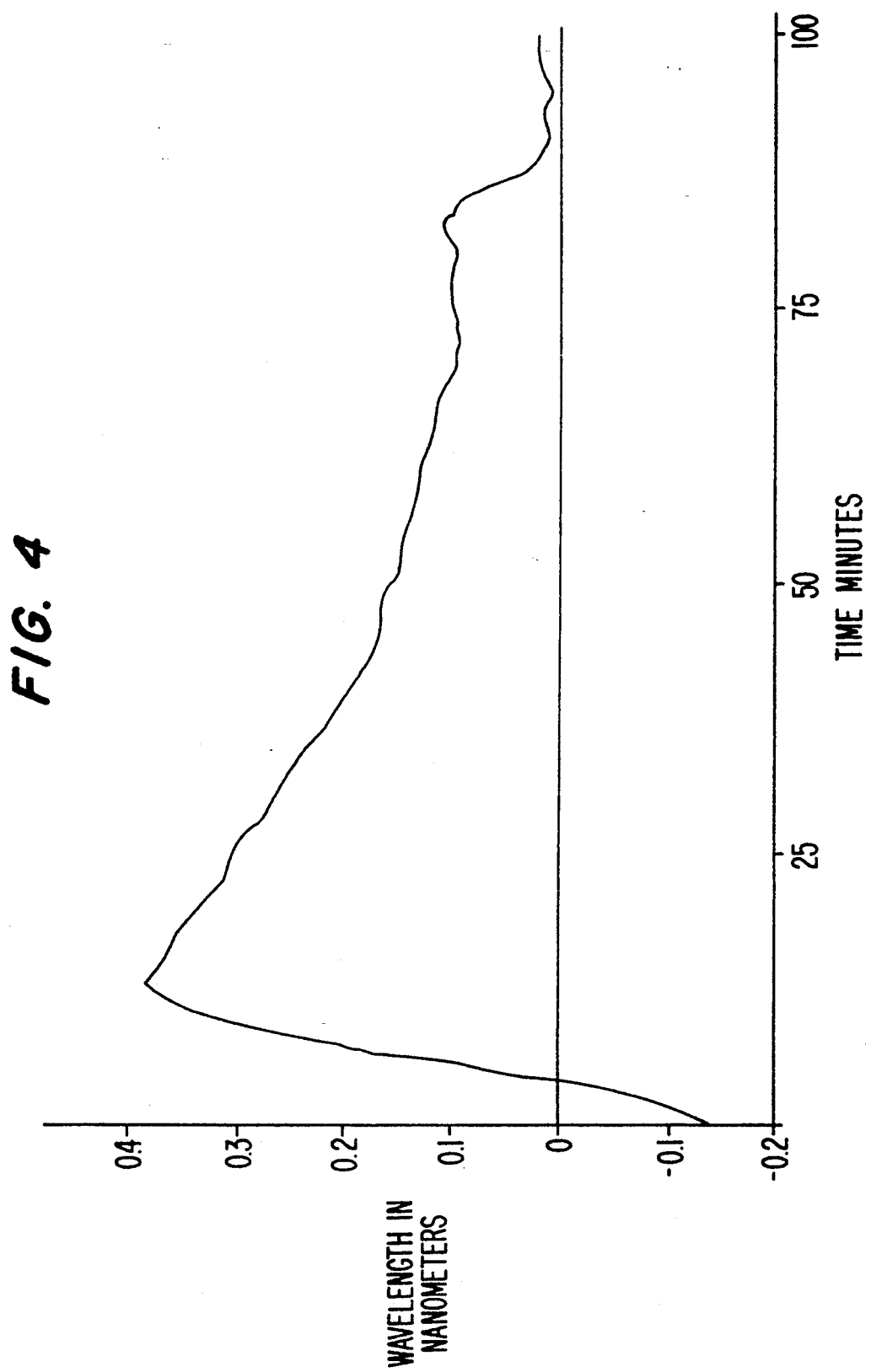

SPECTROPHOTOMETER WITH FAN SPEED CONTROL FOR TEMPERATURE REGULATION

BACKGROUND OF THE INVENTION

This invention relates to spectrophotometric instruments and more particularly, to a spectrophotometric instrument provided with a temperature regulating system, which minimizes the drift in the wavelength and photometric output from the instrument. Spectrophotometers are used to measure color and in the near infrared range, to analyze substances. In such instruments, a broad band of light irradiates a reflecting diffraction grating, which disperses the light into a spectrum. A narrow portion of the spectrum is used to analyze the substance.

The accuracy of the instrument depends upon the capability of the instrument to disperse the parts of the spectrum to precisely predetermined angular positions in the instrument and with precisely predetermined intensities for a given intensity of illumination of the grating. Temperature variation in the instrument causes a position of the spectrum dispersed from the grating to drift as well as causes a drift in the photometric output of the instrument.

Present state-of-the-art instruments mount the components of the instruments on a heat sink, which is cooled by a cooling fan to maintain the temperature of the instrument relatively constant. However, such state-of-the-art instruments are subject to some drift in the spectrum of up to ½ of a nanometer in wavelength. To overcome the problem of drift in spectrophotometric instruments, it has been proposed to enclose the instrument in a cast iron case surrounded by heating blankets, the energization of which is controlled by a temperature sensor to attempt to maintain the instrument at a constant temperature. Another system has been proposed to provide oil passageways in the walls of the instrument and to circulate oil through the passageways with the temperature of the oil being regulated. Both of the above described systems involve considerable structural modification of the instrument and would substantially add to the cost of the instrument.

The present invention achieves temperature control of the instrument by a very simple expedient. In the instrument of the present invention the components of the instrument are mounted on a thick central heat conducting plate, which serves as a heat sink. A fan is provided, which directs air over both sides of this plate. In accordance with the invention, the speed of the fan is controlled through a continuous speed range in accordance with the output signal of a temperature sensor mounted to sense the temperature of the heat sink to maintain the temperature of the heat sink at a constant temperature. With this system, the temperature of the heat sink plate is held at a substantially constant temperature about 10 minutes after start up of the instrument and the photometric drift is held to a very low value after 10 minutes. The wavelength drift in the instrument after the instrument has been turned on for 85 minutes drops to less than 0.04 nanometers. Thus, an extraordinary drop in the wavelength drift is achieved with a very simple temperature control system.

BRIEF DESCRIPTION OF THE DRAWINGS

FIG. 4 is a graph showing the variation in output wavelength with time after the instrument of the invention is turned on.

As shown in FIGS. 1 and 2, the instrument is enclosed in a housing 11 and has extending vertically through the housing a thick steel plate 13 about ½ inch thick. The plate 13 serves as a heat sink for the instrument. A recess 15 is cut in the edge of the plate 13 and in this recess, a fan 19 is mounted so that a minor portion of the fan 19 extends on the opposite side of the plate from that shown in FIG. 1. Accordingly, the fan 19 will blow air on both sides of the plate 13. The fan 19 is located adjacent to the housing wall 11, which is provided with an aperture closed by a filter 21 through which the fan 19 draws air to direct it over the plate 13. The plate 13 divides the space within the housing 13 into two parts, a smaller part on the opposite side of the plate 13 shown in FIG. 1 and a larger part on the side of the plate shown in FIG. 1. The space on the side of the plate shown in FIG. 1 is divided by a baffle 23, which extends diagonally through this space in a zig-zag configuration as shown in FIG. 1. The space above the baffle 13 is the spectrophotometric chamber in which an oscillating reflecting diffraction grating 25 is mounted. The grating 25 is oscillated by a motor 26. The oscillating operation of the grating 25 is fully described in copending application Ser. No. 07/294,679, filed Jan. 9, 1989, now U.S. Pat. No. 4,969,739 and assigned to the assignee of this application. In a central portion of the baffle 23 is an entrance slit 27 for the grating 25. An infrared light source in the form of a lamp 29 is mounted in the space below the baffle 23 to direct near infrared light through the entrance slit 27. A mirror 31 is provided to fold the beam of light passing through the entrance slit 27 and direct it to the diffraction grating 25. The diffraction grating 25 disperses the light in the spectrum, which is reflected toward an exit slit 32 over which a cylindrical lens 33 is mounted to direct the light passing through the exit slit onto a sample. As the grating 25 is oscillated by the motor 26, the spectrum is moved across the exit slit 32. At any given time, a narrow wavelength band of light from the spectrum will pass through the exit slit and be applied to the sample. Because of the oscillation of the grating 25, the central wavelength of the band irradiating the sample is scanned through the spectrum.

In accordance with the invention, a temperature sensing transducer 35 is mounted on the plate 13, on the opposite side from that shown in FIG. 1 to detect and generate a signal proportional to the temperature of the plate 13. As shown in FIG. 3, the output signal of the temperature sensor 35 is applied to a differential amplifier 37, which also receives a reference signal voltage from a voltage source 39 applied to the inverting input of the differential amplifier. The amplifier 37 amplifies the difference between the two signals applied by the reference voltage source 39 and the temperature sensor 35 and energizes a DC motor 41 of the fan 19 and drives the fan 14 at a speed varying in accordance with the output signal of the temperature sensor 35. As the output signal of the temperature sensor 35 increases, the amplifier 37 increases the voltage applied to the motor 41 to increase its speed and vice versa. In this manner, the speed of the fan motor is controlled to vary directly in accordance with the temperature of the heat sink plate 13. As a result of controlling the fan speed in this manner, a few minutes after start up, the temperature of the heat sink plate is maintained at a substantially constant temperature.

Figure 1:
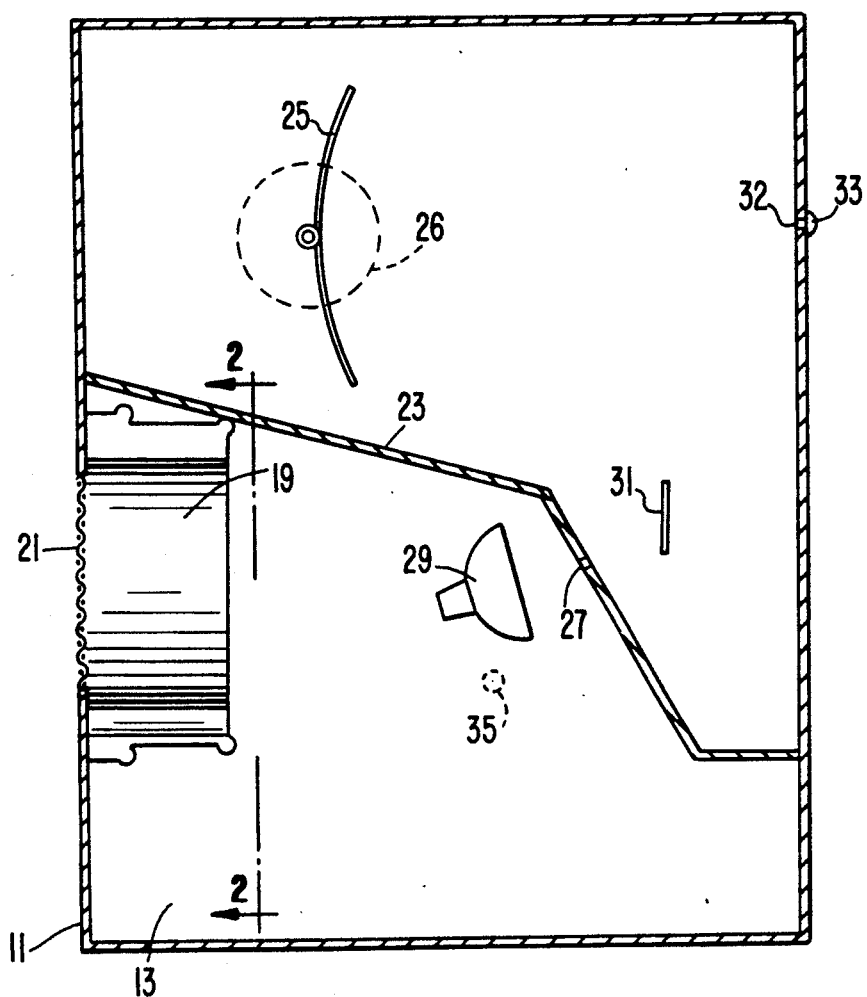
FIG. 1 is a partial sectional side view in elevation of the instrument.
Figure 2:
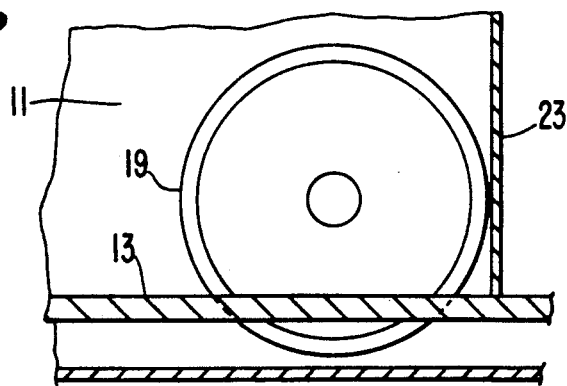
FIG. 2 is a sectional view of the instrument shown in FIG. 1 taken along the line 2—2 of FIG. 1 showing the position of the instrument fan relative to the heat sink plate.
Figure 3:
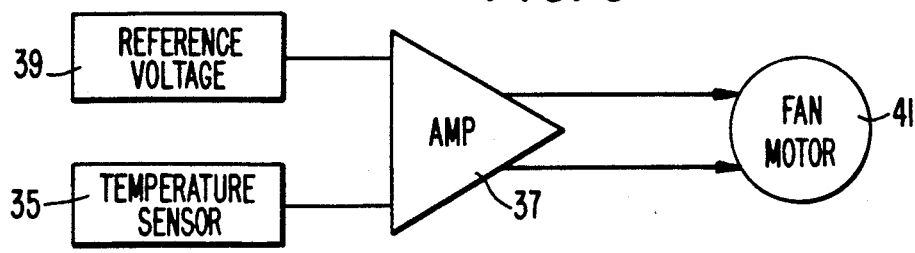
FIG. 3 is a circuit diagram illustrating the speed control circuit for controlling the speed of the fan of the instrument.

The graph shown in FIG. 4 is taken from experimental data on a spectrophotometer, in which the system of the present invention is employed and shows how the output wavelength passing through the exit slit 32 varies with time after start up for a given angular position of the grating 25. The data represented by FIG. 4 was with a warm start-up, which means that the electric circuitry of the instrument had been energized, with the lamp deenergized, a sufficient time prior to time 0 on the graph for the temperature to reach equilibrium. As shown in this Figure, the drift drops to and remains below 4/100 of a nanometer 85 minutes after the warm start up. Thus, the system of the present invention achieves an extraordinary drop in wavelength drift with a very simple system for controlling the temperature of the instrument.

The above description is of a preferred embodiment of the invention and modification may be made thereto without departing from the spirit and scope of the invention, which is defined in the appended claims.

What is claimed is:

1. A spectrophotometer comprising a one-piece heat sink plate defining a flat mounting surface, an optical reflecting grating mounted on said heat sink plate, a light source mounted on said heat sink plate on said flat mounting surface positioned to irradiate said grating, said grating dispersing the light irradiating said grating into a spectrum, and a fan positioned to blow air over said flat mounting surface, temperature sensing means to sense the temperature of said heat sink plate and to generate an output signal varying in accordance with said temperature and means responsive to the output signal of said temperature sensing means to control the speed of said fan to vary directly in accordance with the temperature sensed by said temperature sensing means.

2. In a spectrophotometer as recited in claim 1, wherein said fan is driven by an electric motor and said means to control the speed of said fan comprises means to amplify the output signal of said temperature sensing means and apply the amplified signal to said motor.

3. In a spectrophotometer as recited in claim 2, wherein said amplifier is a differential amplifier and wherein the output signal of said temperature sensing means is applied to one side of said differential amplifier and a reference signal is applied to the other side of said differential amplifier.

4. In a spectrophotometer as recited in claim 1, wherein said fan is positioned to blow air over both sides of said heat sink plate.

5. In a spectrophotometer as recited in claim 4, wherein a housing encloses a space on one side of said heat sink plate including said grating and said light source wherein a dividing wall baffle separates said grating from said light source, an entrance slit is defined in said dividing wall baffle between said light source and said grating, said light source irradiating said grating through said entrance slit, said fan blowing air over said heat sink plate on the same side of said baffle on which said light source is mounted.

6. In a spectrophotometer as recited in claim 5, further comprising means defining an exit slit for receiving a narrow portion of said spectrum.

7. In a spectrophotometer as recited in claim 6, wherein said grating is mounted for oscillation and a motor is connected to said grating to oscillate said grating.

* * * * *